Nov. 2, 1965  H. M. HERMAN  3,214,864
ANIMATED ACCESSORY FOR MODEL RAILROADS
Filed Sept. 5, 1962  4 Sheets-Sheet 1
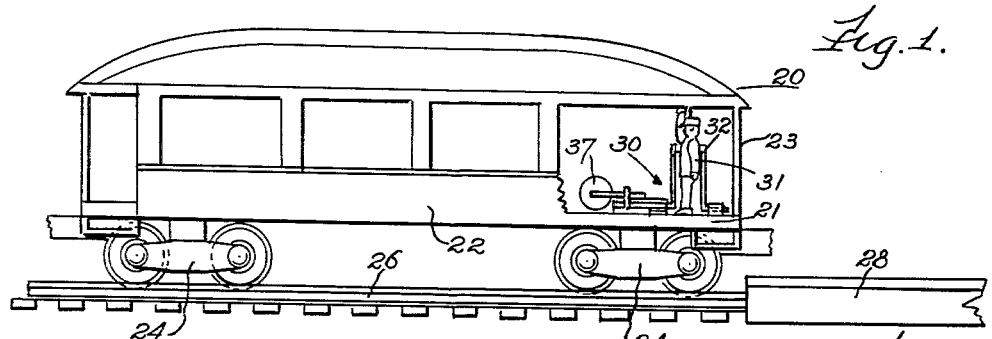
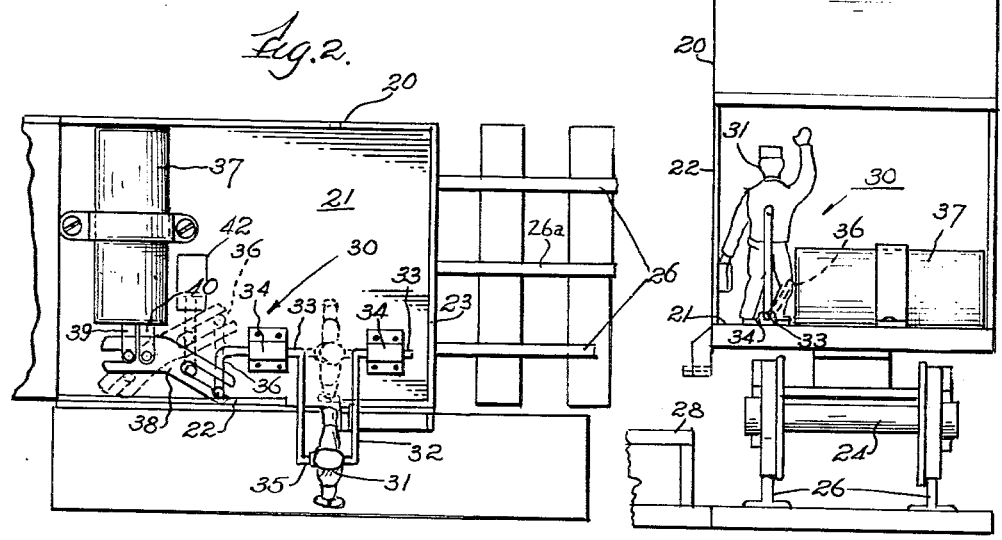
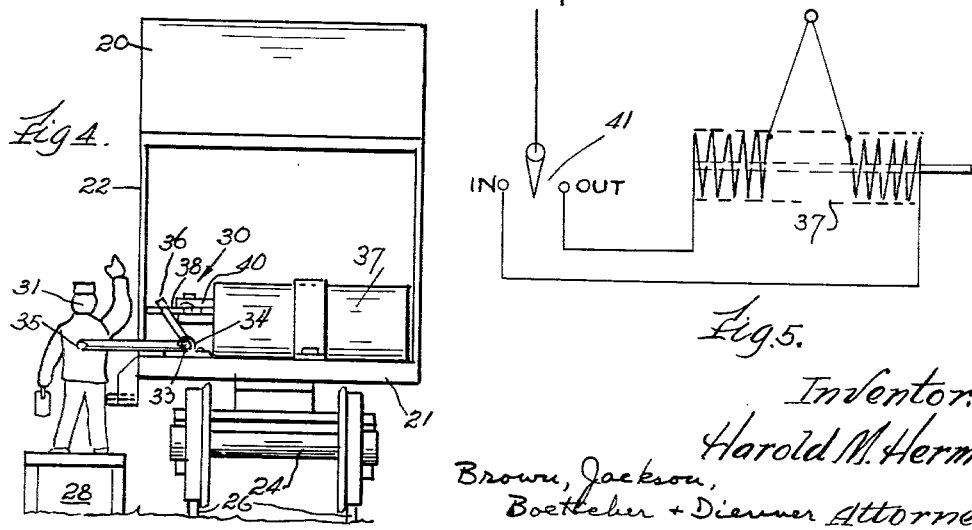
Inventor:
Harold M. Herman
Brown, Jackson,
Boettcher + Dienner Attorneys Nov. 2, 1965        H. M. HERMAN        3,214,864
ANIMATED ACCESSORY FOR MODEL RAILROADS
Filed Sept. 5, 1962        4 Sheets-Sheet 2
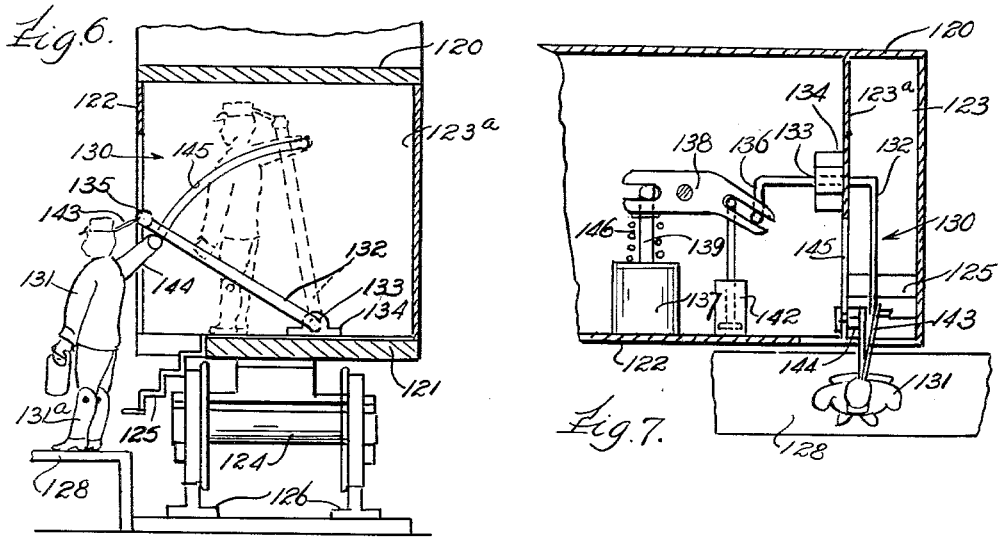
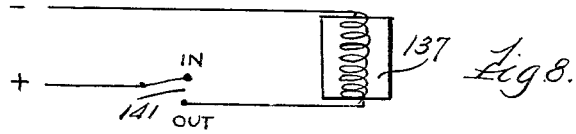
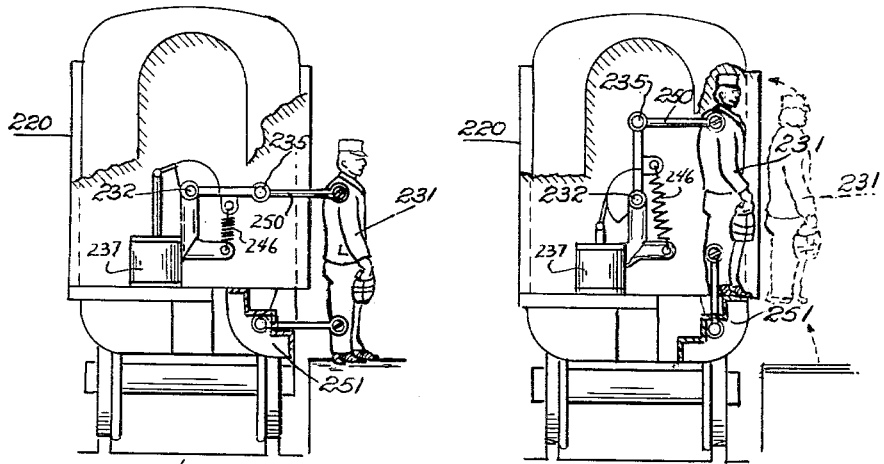
Inventor.
Harold M. Herman,
Brown, Jackson,
Boettcher + Dienner Attorneys Nov. 2, 1965  H. M. HERMAN  3,214,864
ANIMATED ACCESSORY FOR MODEL RAILROADS
Filed Sept. 5, 1962  4 Sheets-Sheet 3
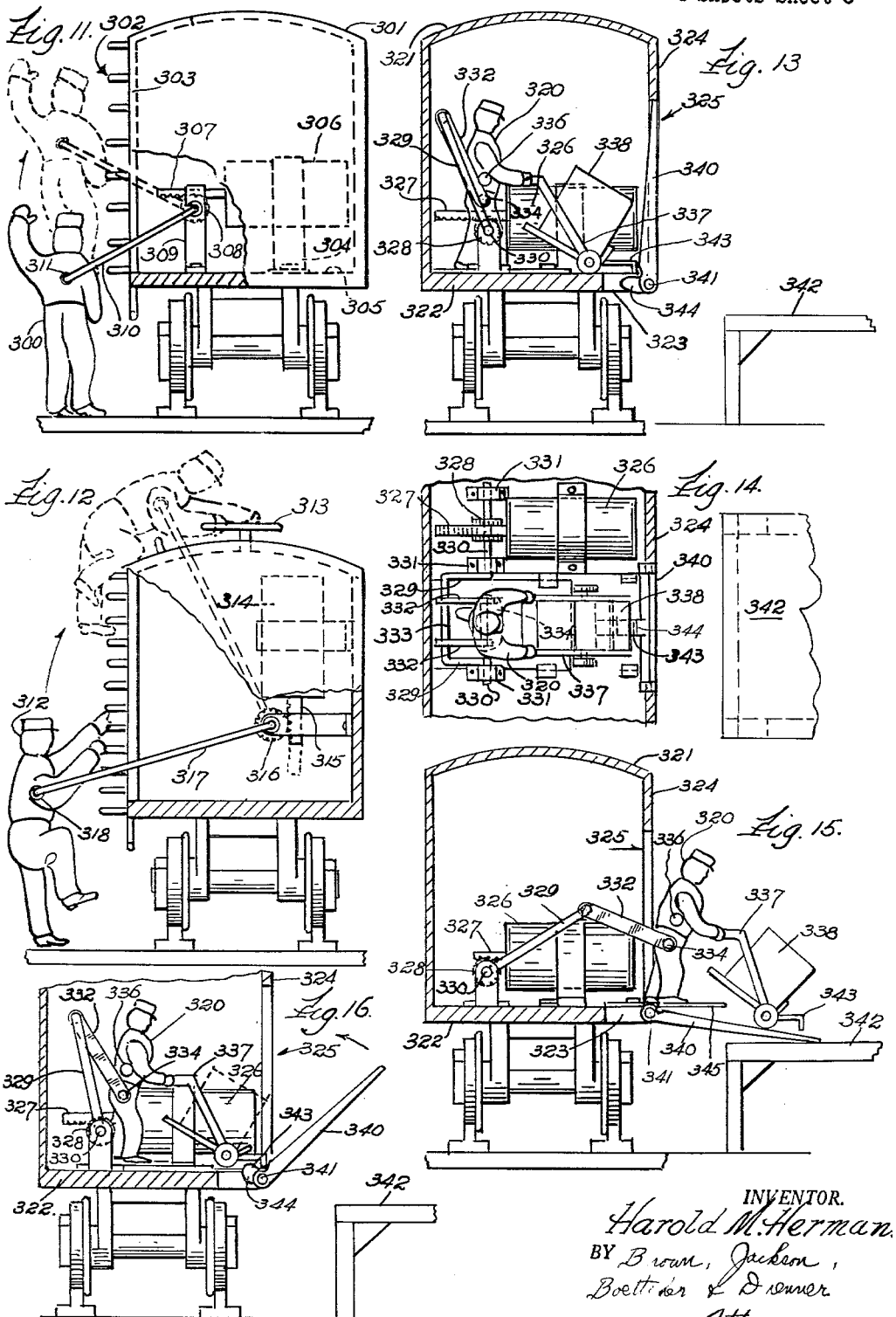
INVENTOR.
Harold M. Herman.
BY Brown, Jackson,
Boettcher & Dienner.
Attorneys.

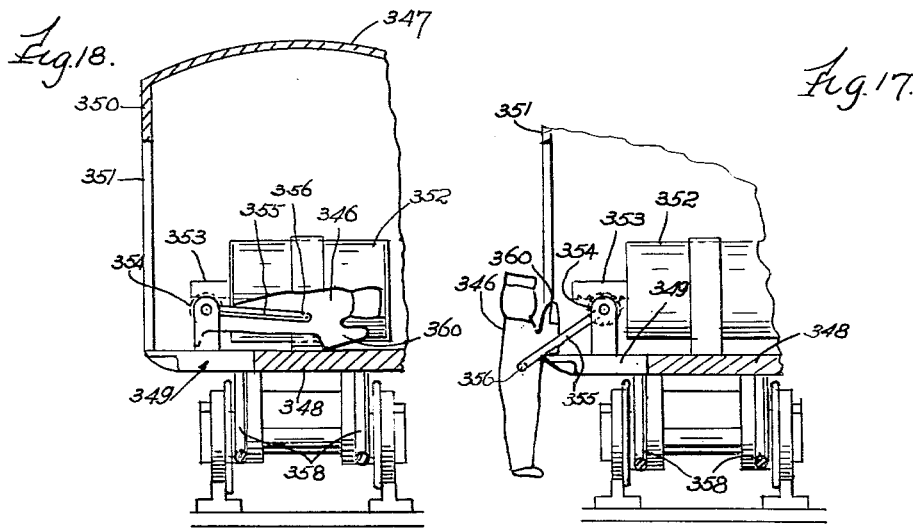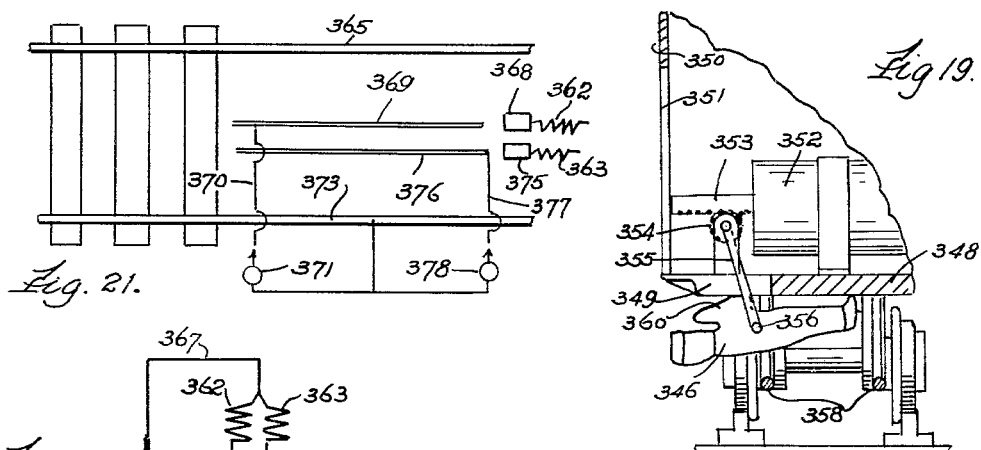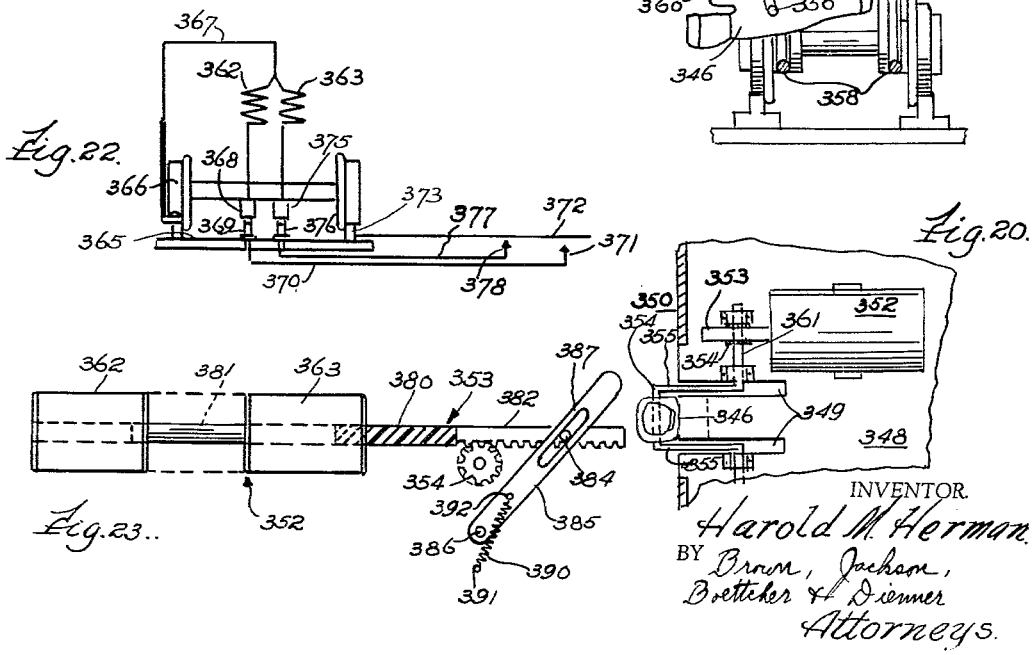

United States Patent Office 3,214,864
Patented Nov. 2, 1965

3,214,864
ANIMATED ACCESSORY FOR
MODEL RAILROADS
Harold M. Herman, 6604 N. Whipple St., Chicago, Ill.
Filed Sept. 5, 1962, Ser. No. 222,760
6 Claims. (Cl. 46—245)

This application is a continuation-in-part of my pending application Serial No. 17,606, filed March 25, 1960, now abandoned, entitled Animated Accessory for Model Railroads and the Like, which application is being abandoned upon the filing of the present application.

The present invention relates to model railroads and the like, particularly to a realistically animated accesssory therefor comprising a figure associated with a model railroad car and automatically movable relative thereto at the control of the operator in such manner as to simulate a person carrying out various types of operations.

For example, in accordance with one embodiment of the present invention a toy figure is moved so as to simulate a person alighting from and boarding the car. In accordance with other embodiments of the invention a toy figure is moved to simulate various work functions such as a person climbing or descending a ladder on the side of the car, or a person moving from a standing position alongside the car to a position under the car to give the appearance of a man "riding the rods." Numerous and various actions may be simulated in accordance with the present inventive teaching, and the foregoing specific embodiments are given only by way of example.

Animated accessories have previously been proposed for model railroads, and in terms of the first-mentioned specific animation above described, I am aware of one endeavor to provide a toy figure associated with the car and movable into and out of the car. In this case, however, the figure is simply moved in a horizontal path a very short distance from a position on the car platform to a position wherein the figure supposedly simulates a trainman standing on the car platform and leaning outwardly beyond the side of the car.

It is a general object of the present invention to provide a toy figure and associated mechanism for actuating the same whereby the figure is moved through exceptionally realistic and relatively complex motions by means of simple and inexpensive mechanism.

A further object of the present invention is to provide a toy figure which is pivotally associated with a crank throw whereby upon movement of the crank throw about its axis the toy figure is moved relative to an associated model railway car so as to simulate a person carrying out various operations in or about the car.

In contrast to the prior art, a more specific object of this invention is to provide an improved animated accessory realistically simulating a person alighting from and boarding a train car, i.e., moving outwardly downward from the car and upwardly inward into the car, for example as though using the conventional steps or stairway of an actual train car and descending from the car onto a station platform and ascending the steps into the car.

Another object of the invention is to provide an improved animated accessory as aforesaid including highly simplified actuating means therefor comprising, essentially, a crank shaft journalled in the car and having an eccentric throw, and means for oscillating the shaft between a first position in which the throw is spaced upwardly from the bottom of the car and inwardly from the side thereof and a second position wherein the throw is disposed closer to the bottom and the side of the car, the figure being operatively connected to said throw to be moved thereby outwardly and downwardly and inwardly and upwardly in a manner to simulate realistically a person alighting from and boarding the car.

A further object of the invention is the provision of an improved accessory as above defined which, in a simplified embodiment, includes a crank shaft having a throw that is oscillatable as defined between a said first position within the car and a said second position exteriorly of the car, and a toy figure pivotally mounted on said throw in such manner that the figure is disposed within the car with its lower extremity adjacent the bottom wall of the car in said first position of said throw and is disposed exteriorly of the car in a lowered position relative thereto in said second position of said throw, the figure being so counter-balanced as to remain upright irrespective of the position of said crank shaft.

It is also an object of the invention to embody the accessory in such form as to simulate a person using the steps or stairway of a railroad car, the car in this instance being provided with a vestibule for reception of the figure in the said first or inner position of the crank throw and a stairway leading downwardly from the vestibule to the side of the car at an inclination corresponding generally to the path of movement of the figure, the figure in this case being provided with articulated leg engageable with the stairway to be moved relative to the stairway and the body of the figure to simulate a person walking on steps.

An additional object of the invention is to provide embodiments of the invention wherein the crank is concealed within the car and the figure is operatively connected to the crank by unobstrusive means thereby to impart to the figure an appearance of independence: the said means in one embodiment comprising a filament-like connector between the figure and the crank throw, a guide plate within the car having a guide slot therein and a follower on the figure slidably received in the slot; the said means in another embodiment including one or more parts simulating parts of a conventional railroad car, such as the foldable stairway of a streamline passenger car.

A still further object of the invention is the provision of an improved animated accessory as aforesaid including automatic operating means for the crank shaft, the operating means preferably comprising any one of three solenoid arrangements adapted to derive power from the electric power source for the model railroad layout.

Other objects and advantages of the invention will become apparent in the following detailed description.

Now, in order to acquaint those skilled in the art with the manner of making and using my animated accessory, I shall describe, in connection with the accompanying drawings, preferred embodiments of the accessory and preferred manners of making and using the same.

In the drawings, wherein like reference numerals indicate like parts:

FIGURE 1 is a side elevation of a model railroad car, the track therefor and a model platform, a portion of the side wall of the car being broken away to reveal the embodiment therein of the animated accessory of the invention;

FIGURE 2 is a fragmentary horizontal cross-section of the car showing one embodiment of my improved accessory, the view depicting the toy figure in its exterior position in solid lines and in its interior position in dotted lines;

FIGURE 3 is a vertical cross-section of the car of FIGURE 2 showing the figure in its inner position;

FIGURE 4 is a view similar to FIGURE 3 showing the toy figure in its outer position;

FIGURE 5 is a schematic diagram of the electric circuit for the embodiment of the invention shown in FIGURES 2 to 4;

FIGURE 6 is a view similar to FIGURE 4 showing a second embodiment of the invention;

FIGURE 7 is a fragmentary horizontal section of the embodiment of the invention shown in FIGURE 6, the view also depicting a modified form of operating means for the accessory;

FIGURE 8 is a schematic diagram of an electric circuit applicable to the operating means shown in FIGURE 7;

FIGURES 9 and 10 are views similar to FIGURES 4 and 3, respectively, showing a third embodiment of the invention;

FIGURE 11 is an end elevational view, partly in section, illustrating another embodiment of the invention wherein a toy figure is moved upwardly and downwardly to simulate a person climbing and descending a ladder on the side of a railway car;

FIGURE 12 is an end elevational view showing a somewhat modified form of the embodiment of FIGURE 11 whereby the toy figure is moved through a greater stroke so as to simulate a brakeman climbing a ladder on the side of the car and operating a brake control located at the top of the car;

FIGURE 13 is a vertical section through a railway car illustrating a further embodiment of the invention whereby a toy figure is moved so as to simulate a baggageman or the like moving a loaded handtruck out to a platform alongside the car, a ramp being provided which is in a substantially upright position when the toy figure is inside the car and which is moved to a generally horizontal position when the toy figure is in its position outside the car;

FIGURE 14 is a fragmentary top plan view of the structure of FIGURE 13;

FIGURE 15 is a view similar to FIGURE 13 showing the toy figure in its alternate position wherein the ramp is down and the figure is outside the car;

FIGURE 16 is a fragmentary vertical section similar to FIGURE 15 showing the toy figure being moved into the car and the associated ramp being moved toward its generally upright or closed position;

FIGURES 17, 18 and 19 are fragmentary vertical sections showing still another embodiment of the invention wherein a toy figure simulating a hobo may be moved from a first position standing alongside a railway car to a second position wherein the hobo moves up into the car or to a third position wherein the hobo moves under the car to simulate a man "riding the rods";

FIGURE 20 is a fragmentary horizontal section of the mechanism of FIGURE 17;

FIGURES 21 and 22 are schematic wiring diagrams for the embodiment of FIGURES 17–20; and FIGURE 23 is a somewhat schematic elevational view of a solenoid arrangement for actuating the mechanism of FIGURES 17–20.

Referring now to the drawings, and particularly to FIGURE 1, I have shown the animated accessory of the present invention embodied in a model railroad car 20 having the usual floor or bottom wall 21, side walls 22 and end walls 23, the car being mounted on conventional trucks 24 for operation over the customary track 26 and for movement on the track adjacent a platform 28 simulating a railroad station. The car illustrated herein is a passenger car, in which case the animated toy figure of the invention may be representative of a porter, a conductor, or a passenger movable into and out of the vestibule of the car. It is to be appreciated, however, that the invention is equally applicable to freight cars and cabooses, in which case the figure may be representative of a hobo, or of a trainman such as a brakeman.

In FIGURES 1 through 5 I have shown a first embodiment of the animated accessory of the present invention, indicated generally at 30, mounted within one end portion of the car 20. The accessory includes a toy figure 31 adapted to stand in the vestibule of the car and to move outwardly and downwardly through the usual passenger door opening in the side wall of the car to assume a position at one side of the car, and to return upwardly and inwardly into the vestibule area of the car. The mechanism for so moving the toy figure 31 comprises, essentially, a crank shaft 32 having a pair of journal portions 33 rotatably mounted in respective bearing straps which are secured to the floor 21 of the car 20. The crank shaft 32 also includes a first eccentric throw 35 disposed between the bearings 34 in alignment with the vestibule and door opening of the car, and a second crank throw 36 disposed inwardly of the vestibule area adjacent one of the bearing straps 34. The crank shaft 32 is adapted to be oscillated by means of a solenoid 37 through the intermediary of a motion converting and amplifying lever 38. The solenoid 37 is mounted within the car transversely thereof and is provided with a horizontally movable core extension 39 engageable with the lever 38. The lever in turn is pivoted on a vertical axis on a bracket 40 suitably secured to the casing of the solenoid and includes a first relatively short lever arm having a slot therein for slidable reception of the extension 39 of a second relatively long lever arm having a slot therein for slidable reception of the crank throw 36. The arrangement is thus such that the relatively short stroke of the solenoid core is amplified to move the said second arm of the lever a substantial distance to oscillate the crank shaft through a relatively large arc of movement.

In the embodiment of the invention shown in FIGURES 1 through 5, the solenoid 37 is a double-acting solenoid having two coils momentarily energizable selectively to shift the core thereof in opposite directions, thereby to oscillate the shaft 32 between two separated end positions, which in this embodiment are arcuately spaced by about 90 degrees. As depicted in FIGURE 5, the solenoid coils may both be connected at adjacent ends thereof to a common power lead, which may suitably be coupled to one rail of the track through a wheel of the car and thus to one side of the power source. The other ends of the coils are connected to the contacts of a single-pole, double-throw switch 41, which may be mounted on the car and coupled to the other side of the power source through another car wheel and the other rail of the track, or which may comprise a track-side switch to which the two coils of the solenoid are connected by cooperable car-mounted and track-side commutator means 26a, as is conventional in the model railroad art. In either case, momentary closure of the switch 41 will effect movement of the core extension 39 in the selected direction, whereafter the coil may be de-energized and the core extension and the crank shaft will remain in the position to which last moved. As will become apparent as the description proceeds, other solenoid and switch arrangements may be employed with equal facility.

The eccentric throw of the crank shaft 32 in the embodiment of the invention shown in FIGURES 2 to 4 is of a length and disposition relative to the journal portions 33 and the crank throw 36 that the throw 35 will be positioned upright within the car, as shown in FIGURE 3, in one end position of the shaft and will be disposed horizontally and extend to the exterior of the car through the opening in the side wall thereof in the other end position of the shaft, as is shown in FIGURE 4. The toy figure 31 in this case is pivotally mounted directly on the throw 35 with the throw passing through the upper portion of the body of the figure. The figure is so constructed relative to its pivot axis, or is so counterbalanced by a weight or the like connected or otherwise secured at its lower end, as always to maintain an upright disposition irrespective of the position of the crank. The figure is also of a height such that the lower extremity thereof is disposed closely adjacent the floor 21 of the car in the upright inner position of the crank throw 35 (FIGURE 3), and is disposed to substantially engage the platform 28 or a like member in the horizontal outer position of the throw, as shown in FIGURE 4.

Thus, upon appropriate manipulation of the switch 41, the toy figure 31 is moved outwardly and downwardly from the vestibule or platform of the car to the platform of the station to simulate the movement of a person alighting from the car, and upon reverse manipulation of the switch, the toy figure is moved upwardly and inwardly from the station platform to the vestibule area of the car in a fashion simulating the movement of a person boarding the car. Since the movements of a person in alighting from and/or boarding a car are usually relatively slow, I prefer to incorporate a small, double-acting dashpot 42 in the actuating mechanism to appropriately slow the movement of the solenoid and thus of the toy figure.

In FIGURES 2 to 4, the toy figure 31 is shown as facing toward the front of the car, and may appropriately be designed to give the appearance of a trainman signalling the engineer. For greater realism in portraying a person alighting from the car, it may sometimes be desirable to have the toy figure face outwardly of the side of the car, as depicted in FIGURES 6 and 7 for example. In these figures, parts of the illustrated apparatus corresponding to parts of the apparatus of FIGURES 1 to 5 are indicated by the same tens and digits numerals in the 100 series of numbers, the toy figure being indicated at 131. To enhance the realism of the simulation, the toy figure 131 may be provided with articulated legs or leg portions 131a, and the vestibule portion of the car 129 may be provided with a stairway 125 leading downwardly from the floor 121 of the car, from a point adjacent the inner position of the toy figure, to the side of the car at an inclination generally corresponding to the path of movement of the toy figure, whereby the articulated leg portions 131a will engage the tread portions of the steps 125 during movement of the figure and will thereby be caused to move relative to the body of the figure to simulate the leg motion of a person walking down the stairs. To facilitate this action, the treads and risers of the stairs are preferably curved or bucketed, as indicated in FIGURE 6.

In conjunction with the toy figure 131, I have shown a modified form of actuating mechanism that is relatively unobtrusive, thereby to impart to the toy figure a greater degree of apparent independence. In particular, the crank shaft 132 is so mounted and oscillated as to remain within the confines of the car at all times, and to be concealed from view by the walls of the car and the toy figure. Specifically, the car 129 is provided with an imperforate end wall 123 and a parallel vestibule partition wall 123a behind which the crank shaft bearing 134, the lever 138 and the solenoid 137 are located. Also, the eccentric throw 135 of the crank shaft is sustained by a single crank arm, so that this arm and the throw may be concealed behind the toy figure 131 as illustrated. The toy figure is operatively connected to the throw 135, to be controlled thereby, by means of a thin filament 143 which is connected to the rear of the figure and is generally concealed thereby. In this structure, the toy figure is guidably supported by means of a follower 144 secured to the figure and slidably mounted in a guide slot 145 in the partition wall 123a. The slot 123a is inclined in a downward outward direction properly to guide the toy figure for its intended movement, and is also so correlated to the path of movement of the crank throw as to cause the figure to maintain an upright position at all times. If desired, the lower portions of the toy figure may also be weighted to insure this result.

As will be appreciated from the solid and dotted line representation in FIGURE 6 of the two positions of the toy figure 131, the crank shaft is swung in a relatively short arc in this embodiment of the invention, so short in fact that the crank arm 136 of the shaft may be connected directly to the core extension 139 of the solenoid. However, in FIGURE 7, I have shown the preferred structure wherein a motion amplifying lever 138 is provided between the extension 139 and the shaft 132. Also, in this figure, I have shown a modified solenoid arrangement comprising a single-acting solenoid 137 having a core extension 139 normally biased for movement in one direction by a spring 146, and adapted to be moved in the opposite direction upon energization of the solenoid coil. The coil may in one embodiment be connected through the wheels of the car to the rails of the track and thus to opposite sides of the power supply whenever power is supplied to the tracks. In such case, the solenoid would be energized whenever the track was energized to move the train, which would cause the solenoid core to be drawn in and the crank shaft to be rotated to move the throw 135 and the toy figure 131 into the interior of the car. Thus, the figure would be located within the interior of the car whenever the train was running, and would be automatically moved to the exterior of the car by the spring 146 whenever the car was stopped upon de-energization of the track. This arrangement may be applied to any embodiment of the invention and would be particularly advantageous in instances wherein the toy figure is representative of a brakeman or the like.

Alternatively, the solenoid 137 may be connected for selective manual control by utilization of the circuit depicted in FIGURE 8, wherein a switch 141, connected in either of the manners described in conjunction with the switch 41, is included in the circuit of the solenoid coil. With this circuit arrangement, which may of course be applied to any embodiment of the invention, it is preferred that the solenoid and its associated spring be reversed from the position shown in FIGURE 7, so that the toy figure will normally be retained within the interior of the car by the spring, and will be movable to the exterior of the car upon energization of the solenoid.

Referring now to FIGURES 9 and 10, I have shown a further embodiment of the invention, the parts of which corresponding to previously described elements have been indicated by the same tens and digits numerals in the 200 series of numbers. In this embodiment, the crank shaft 232 is mounted within the interior of the car on a bracket carried by the solenoid 237, and the eccentric throw 235 of the shaft is disposed for movement within the vestibule area of the car from a lower outer position (FIGURE 9) to an upper inner position (FIGURE 10). The toy figure 231 is connected to the throw 235 by a connecting rod 250 which is pivotally connected at its ends to the throw and to the toy figure adjacent the upper end thereof, the rod preferably fitting into the interior of the figure and being concealed therebehind. At its lower end, the toy figure is operatively connected to the car by a link 251 which is pivotally connected at its ends to the lower end portion of the figure and the lower wall or floor portion of the car 220, the link serving in conjunction with the connecting rod 250 to retain the figure upright. In the illustrated structure, the car 220 is a streamline passenger car, and the link 251 is designed to simulate the folding stairway of such a car, the link exhibiting stair treads in the outer position of the toy figure (FIGURE 9) and an arcuate surface complementary to the skin of the coach in the inner position of the toy figure (FIGURE 10). Also, the structural arrangement imparts considerable realism to the model, since the toy figure (for example simulating a porter) appears standing in the vestibule of the car in its inner position, and appears immediately outwardly of the stairway in its outer position.

Referring now to FIGURE 11, there is shown another embodiment of the invention wherein a toy figure 300 is associated with a railroad car 301 to simulate a man climbing a ladder 302 mounted exteriorly on a side wall 303 of the car. A first upright supporting bracket 304 is mounted on a bottom wall 305 of the car and carries at its upper end a solenoid 306. The solenoid 306 has a plunger 307 with teeth formed thereon so as to comprise a rack which is adapted to actuate a pinion 308 which is supported at the upper end of a second upright bracket 309. A crank shaft 310 is operatively connected to the pinion 308 and a crank throw 311 extends through the upper body portion of the toy figure 300. The figure 300 is thus pivotally mounted directly on the throw 311 and is balanced thereon so as to maintain an upright position regardless of the position of the crank. The solenoid 306 is adapted to move the figure 300 between a lower position where the figure appears to be standing alongside the car and an upper position as shown in dotted lines in FIGURE 11, such movement being adapted to simulate a man climbing the ladder 302 on the side of the car.

FIGURE 12 is substantially the same as FIGURE 11 except that a toy figure 312 is moved through a greater stroke to simulate a main climbing a ladder on the side of the car so as to operate a brake control 313 located at the top of the car. Thus, a solenoid 314 is provided with a plunger 315 having rack teeth formed thereon, and the rack 315 actuates a pinion 316 which is operatively connected to a crank arm 317. The toy figure is pivotally mounted on a crank throw 318 whereby when the solenoid 314 is energized the toy figure will be moved from a position standing alongside the car to a position leaning over the top of the car so as to simulate a man turning the brake control 313.

As in the various embodiments previously described, the figure 312 is balanced on the throw so as to tend to maintain an upright position regardless of the position of the crank. However, the mechanism is arranged so that as the toy figure 312 approaches its upper position, the lower portion of the figure will engage against the ladder or the side of the car and cause the figure to be pivoted to an inclined position, as shown in dotted lines in FIGURE 12.

FIGURES 13 to 16 show still another embodiment of the invention wherein a toy figure 320 is associated with a model railroad car 321 having a bottom wall 322 with a portion cut away as at 323 and a side wall 324 with an opening 325 therein. A solenoid 326 has a plunger 327 having rack teeth formed thereon for actuating a pinion 328 which is operatively connected to a crank shaft 329. The crank 329 has journal portions 330 which are mounted in bearing straps 331. A pair of connecting rods 332 are pivotally connected at one end to a crank throw 333 and are pivotally associated with the toy figure 320 at their opposite ends by a cross rod 334 which extends through the body portion of the figure.

The toy figure 320 has a short pin 336 projecting from each side thereof whereby if the solenoid 326 is energized with the parts in the position of FIGURE 13 the crank 329 will be moved from the position of FIGURE 13 to the position of FIGURE 15, and during the initial movement of the connecting rods 332 the latter will engage against the pins 336 to push the figure 320 outwardly. In the embodiment being described, the toy figure 320 has a hand truck 337 integral therewith and a load such as a crate 338 may be carried in the hand truck.

A ramp 340 is pivotally attached to the car 321 by a pin 341 so as to be movable between an upper or closed position as shown in FIGURE 13 where the ramp substantially closes the opening 325 in the car side wall, and a lower position as in FIGURE 15 where the ramp extends from the bottom wall 322 of the car to an adjacent platform 342. The hand truck 337 has a somewhat L-shaped extension 343 at its front end which is adapted to cooperate with a cam portion 344 formed on the ramp 340 near its pivot axis. In this manner, when the figure 320 is moved from the position of FIGURE 13 toward the outside of the car, the extension 343 will push on the ramp 340 and gradually open the latter as the truck 337 is moved toward the platform 342. On the other hand, when the toy figure is moved from the position of FIGURE 15 to the position of FIGURE 13, the L-shaped extension 343 will engage the cam portion 344 (see FIGURE 16) and pull the ramp 340 to its upper or closed position.

As best shown in FIGURE 15, the toy figure 320 is mounted on a slide member 345 which is integral with the figure and adapted to slide along the bottom of the car to maintain the figure substantially upright. It will be noted, however, that the crank mechanism is adapted to move the figure 320 somewhat further outwardly than shown in FIGURE 15, whereby the figure will slide partially down the ramp 340 toward the platform 342. The load such as the crate 338 carried on the hand truck 337 may be so balanced therein that it will be dumped from the truck to the platform when the toy figure has reached its extreme outer position.

FIGURES 17 to 20 show another embodiment of the present invention wherein a toy figure 346 is associated with a toy railway car 347 having a bottom wall 348 with a pair of slots 349 formed therein (see FIG. 20) and having a side wall 350 with an opening 351. A solenoid 352 moves a plunger 353 to any of one of three positions, as will be explained more fully hereinafter, so as to move the figure 346 from a first position as shown in FIGURE 17 where the figure is standing alongside the car, to a second position as shown in FIGURE 18 where the figure is lying down inside the car, or to a third position as shown in FIGURE 19 where the figure is lying under the car to simulate a hobo "riding the rods."

The plunger 353 has rack teeth formed thereon to cooperate with a pinion 354 which is operatively connected to a journal portion 361 of a crank arm 355. An eccentric throw 356 at the end of the crank extends through the upper body portion of the figure 346 so as to be pivotally associated therewith. The figure is balanced on the throw 356 so as to tend to maintain an upright position thereon except when moved to another position through engagement with the car. The crank 355 and throw 356 are aligned with the opening 351 in the car side wall 350 whereby upon energization of the solenoid 352, the crank 355 may be swung upwardly from the position of FIGURE 17 where the toy figure 346 is standing alongside the car to the position of FIGURE 18 where the toy figure is lying down inside the car. While the figure 346 is balanced to maintain an upright position regardless of the crank position, it will be understood that the relative positions of the parts are arranged so that when the crank 355 is swung upwardly the lower body portion of the figure will engage against the side of the railway car causing the figure to assume a horizontal position as it is swung into the car through the opening 351.

In a similar fashion, the solenoid 352 may be energized to move the plunger 353 outwardly rather than inwardly in which case the crank 355 will be swung downwardly from the intermediate position of FIGURE 17 to the position of FIGURE 19 wherein the toy figure 346 will be caused to lie under the car to simulate a man riding on the rods 358. As indicated above, while the toy figure tends to maintain an upright position, it will engage against the car as it is moved downwardly thereunder thus camming the figure to a substantially horizontal position. A cam portion 360 is formed on the front of the figure 346 to effect such camming action when the figure is moved under the car. It will also be noted that when the figure is moved to the position of FIGURE 19, the crank arms 355 will pass through the slots 349 formed in the bottom wall 348 of the car 347.

The solenoid 352 is a double-acting solenoid having a pair of coils 362 and 363 selectively energizable to shift the plunger 353 in opposite directions. FIGURE 22 is an elevational schematic wiring diagram showing the manner in which one rail 365 is connected through a car wheel 366, lead 367, coil 362, a contact brush 368 carried by the car, an inner rail 369, a lead 370, a switch 371, and a lead 372, to the other rail 373. Thus, when the switch 371 is closed the first solenoid coil 362 is connected across the rails of the track, and thus to opposite sides of the power supply whenever power is supplied to the tracks.

In a similar manner, the rail 365 is connected through wheel 366, lead 367, the second solenoid coil 363, a second contact brush 375 carried by the car, a second inner rail 376, a lead 377, a switch 378, and the lead 372, to the rail 373. It will thus be seen that closing of switch 371 will connect the first solenoid coil 362 across the rails of the track and thereby to a source of power, and closing of the second switch 378 will similarly connect the second coil 363 across the power supply. FIGURE 21 is a schematic top plan view of the rails and the trackside switches 371 and 378 for controlling the operation of the mechanism of FIGURES 17–10.

FIGURE 23 shows the solenoid 352 comprising coils 362 and 363, and it shows the plunger 353 which includes a central magnetic core section 380 and a pair of plastic or non-magnetic end portions 381 and 382. The plunger 353 is shown in its extreme outer position corresponding to FIGURE 19 wherein the toy figure 346 is positioned on the rods 358 under the car. Accordingly, the figure 346 will be moved to the position of FIGURE 17 upon closing of switch 378 to energize coil 363, whereupon the magnetic core 380 will be positioned intermediate the coils 362 and 363 so as to extend into the end portions of the coils and thus be operatively associated with both coils. When the magnetic core 380 is thus positioned, the toy figure 346 can either be moved to the position of FIGURE 18 by energizing the coil 362, or moved to the position of FIGURE 19 by energizing the coil 363.

The non-magnetic end portion 382 of the plunger 353 carries a pin 384, and a lever 385 is pivotally mounted at 386 and associated with the plunger by means of a slot 387 adapted to receive the pin 384. An overcenter tension spring 390 has one end fixed at 391 and its other end connected to the lever 385 at 392. It will thus be understood that the lever 385 and associated overcenter spring 390 serve to assist in moving the plunger 353 to either of its extreme positions corresponding to the respective positions of the toy figure as shown in FIGURES 18 and 19.

From the foregoing, it will be appreciated that the present invention provides an animated accessory of particularly economical and practical construction and comprising a toy figure movable relative to a railway car in such fashion as to realistically simulate a person alighting from and boarding a train or a workman carrying out various operations about the railway car.

In each embodiment, a toy figure is operatively connected to a crank shaft for pivotal movement relative thereto. In certain embodiments, the toy figure is pivotally mounted directly on the crank throw, whereas in certain other embodiments a connecting rod or link is provided between the throw and the toy figure. The toy figure is also preferably balanced so as to tend to maintain an upright position regardless of the position of the crank, although in certain embodiments the figure is intentionally moved into engagement with the associated railway car for the purpose of camming the figure to a position other than upright.

While I have shown and described what I regard to be the preferred embodiments of my invention, it will be appreciated that various changes, rearrangements and modifications may be made therein without departing from the scope of the invention, as defined by the appended claims.

I claim:

1. In a model railroad car or the like having bottom and side walls, one of said side walls defining an opening therein, bearing means affixed within said car, a crank shaft including a journal portion journalled in said bearing means on an axis parallel to said one side wall, said crank shaft including a crank throw aligned with said opening and rotatable between a first position spaced upwardly from the bottom wall and inwardly from said one side wall and a second position adjacent the bottom wall and said one side wall of the car, a toy figure operatively connected to said crank throw for pivotal movement relative thereto, said figure being supported by said crank throw in alignment with the opening in said one side wall, means connected to said figure for causing the same to maintain an upright position irrespective of the position of said crank throw, and solenoid means including a core member operatively connected to said crank shaft for selectively rotating same to rotate said crank throw between asid first and second positions, said figure in said first position of said crank throw being disposed within the car with its lower extremity adjacent the bottom wall of the car and in said second position of said crank throw being disposed exteriorly of the car with its lower extremity below the level of the bottom wall of the car, whereby rotation of said crank throw moves said figure outwardly and downwardly and upwardly and inwardly through the opening in the one side wall of the car.

2. In a model railroad car or the like including a bottom wall and a side wall defining an opening therein, bearing means affixed to said bottom wall, a crank shaft including a journal portion journalled in said bearing means of the car on an axis adjacent and parallel to the side wall thereof, said shaft including a crank throw aligned with said opening and rotatable between a generally upright position wherein it is spaced inwardly from the side wall of the car and a generally horizontal position wherein extends outwardly through the opening in the side wall of the car, a toy figure pivotally mounted on said crank throw, said figure having greater weight in the portion thereof below its pivot axis than in the portion above its pivot axis whereby the figure maintains an upright position irrespective of the position of said crank throw, said figure in the said upright position of said crank throw being disposed within the car with its lower extremity adjacent the bottom wall of the car and in the said horizontal position of said crank throw being disposed exteriorly of the car with its lower extremity at a level lower than the bottom wall of the car, and solenoid means including a core member operatively connected to said crank shaft for selectively rotating same to rotate said crank throw between said upright and horizontal positions and thereby move said figure outwardly and downwardly and upwardly and inwardly through the opening in the side wall of the car.

3. In a model railroad car of the like having bottom and side walls, one of said side walls defining an opening therein, bearing means affixed within said car, a crank shaft including a journal portion journalled in the car on an axis parallel to said one side wall, said crank shaft including a crank throw aligned with said opening and rotatable between a first position and spaced upwardly from the bottom wall and inwardly from the one side wall and a second position adjacent the bottom wall and the one side wall of the car, a toy figure operatively connected to said crank throw for pivotal movement relative thereto, said figure being supported by said crank throw in alignment with the opening in said side wall, a transverse wall in the car adjacent said opening defining a downwardly and outwardly inclined guide slot therein, a follower connected to said figure and slidably engaged in said slot, and solenoid means including core member operatively connected to said crank shaft for rotating same to rotate said crank throw between said first and second positions, said figure in said first position of said crank throw being disposed within the car with its lower extremity adjacent the bottom wall of the car and in said second position of said crank throw being disposed exteriorly of the car with its lower extremity below the level of the bottom wall of the car, whereby rotation of said crank shaft rotates said crank throw to move said figure outwardly and downwardly and upwardly and inwardly through the opening in the one side wall of the car, said figure being slidably guided throughout said movements by said slot and said follower.

4. In a model railroad car as set forth in claim 1, a stairway in said car aligned with said opening and extending downwardly from the bottom wall of the car to the one side wall thereof at an inclination corresponding generally to the path of movement of said figure, and articulated legs connected to said toy figure, said legs being engageable with the stairway for simulating a person walking on the stairway.

5. In a model railroad car or the like having bottom and side walls, one of said side walls defining an opening therein, bearing means affixed within said car, a crank shaft including a journal portion journalled in said bearing means on an axis parallel to said one side wall, said crank shaft including a crank throw disposed in alignment with said opening and rotatable between a first position spaced upwardly from the bottom wall and inwardly from the one side of the wall and a second position adjacent the one side wall of the car and downwardly from said first position, a toy figure, a connecting rod having one end pivotally connected to said crank throw and the other end pivotally connected to one end of said figure for enabling pivotal movement of said toy figure relative to said crank throw, a link having one end pivotally connected to the car and the other end pivotally connected to said figure adjacent its other end for causing the figure to maintain an upright position irrespective of the position of said crank throw, and solenoid means including a core member operatively connected to said crank shaft for selectively rotating same to correspondingly rotate said crank throw between said first and second positions, said figure in said first position of said crank throw being disposed within the car with its lower extremity adjacent the bottom wall of the car and in said second position of said crank throw being disposed exteriorly of the car with its lower extremity below the level of the bottom wall of the car, whereby rotation of said crank throw moves said figure outwardly and downwardly and upwardly and inwardly through the opening in the one side wall of the car.

6. The invention of claim 5 wherein said link comprises a disappearing stairway portion having steps formed thereon and a bar portion rigidly connected thereto, said stairway portion being pivotally connected to said car, and the end of said bar portion being pivotally connected to the lower end of said figure, whereby movement of said figure outwardly and downwardly will effect rotation of said stairway portion in one direction to expose said steps, and movement of said figure upwardly and inwardly will effect rotation of said stairway portion in the opposite direction to conceal said steps within said car.

References Cited by the Examiner
UNITED STATES PATENTS

| | | | |
|---|---|---|---|
| 2,774,181 | 12/56 | Cowen | 46—245 X |
| 2,861,391 | 11/58 | Smith et al. | 6—245 |
| 2,975,552 | 3/61 | Bonanno | 46—245 |

FOREIGN PATENTS

| | | |
|---|---|---|
| 233,103 | 5/25 | Great Britain. |
| 726,430 | 3/55 | Great Britain. |
| 582,091 | 8/59 | Canada. |

RICHARD C. PINKHAM, *Primary Examiner.*